K. FORBES.
COMBINATION BACK AND SIDE CURTAIN.
APPLICATION FILED MAR. 1, 1920.
1,422,431.
Patented July 11, 1922.
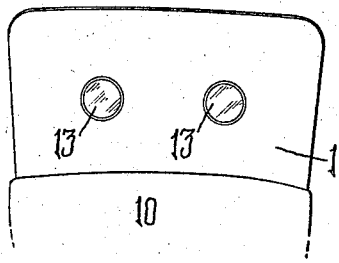
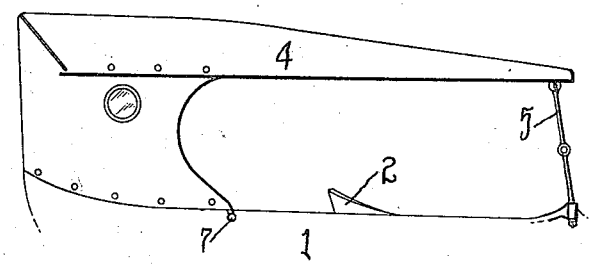
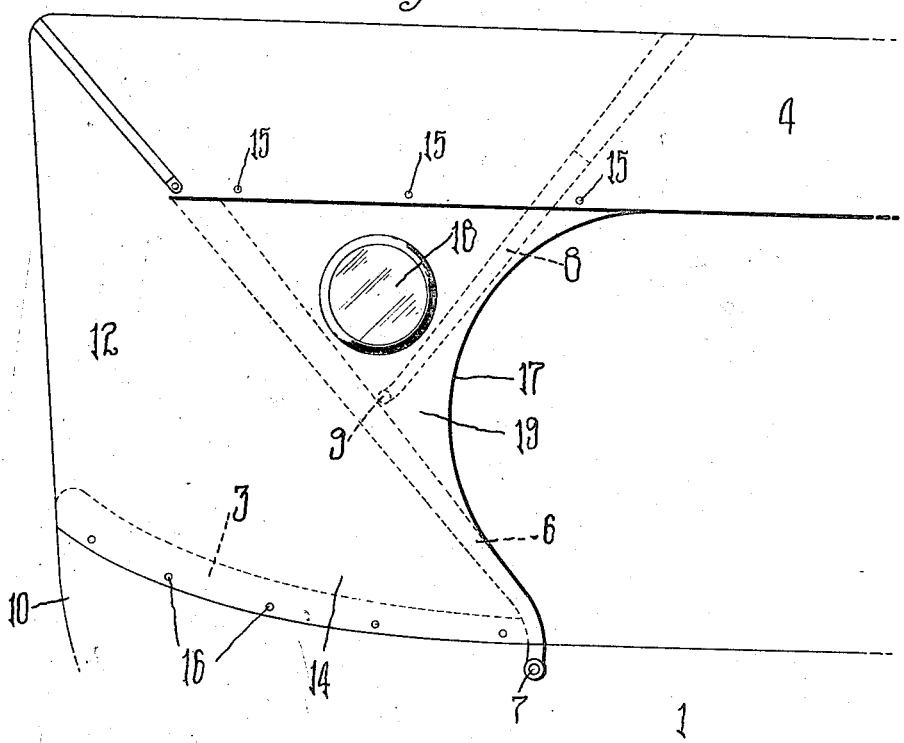
Inventor
Kingston Forbes
By Attorneys

UNITED STATES PATENT OFFICE.

KINGSTON FORBES, OF FLINT, MICHIGAN, ASSIGNOR TO GENERAL MOTORS CORPORATION, OF DETROIT, MICHIGAN, A CORPORATION OF DELAWARE.

COMBINATION BACK AND SIDE CURTAIN.

1,422,431. Specification of Letters Patent. Patented July 11, 1922.

Application filed March 1, 1920. Serial No. 362,389.

*To all whom it may concern:*

Be it known that I, KINGSTON FORBES, a citizen of the United States, and a resident of Flint, county of Genesee, and State of Michigan, have invented certain new and useful Improvements in Combination Back and Side Curtains, of which the following is a full, clear, concise, and exact description, such as will enable others skilled in the art to which the invention relates to make and use the same, reference being made therein to the accompanying drawings, which form a part of this specification.

This invention relates to curtain construction for vehicle tops and has for its object the provision of a curtain that is permanently associated with the top in such a manner that it forms a protection for the occupants of the rear seat.

Another object of the invention is the construction of a curtain having a portion that may be folded back when full protection is not desirable.

Another object of the invention is to provide a unitary back and side curtain that may be employed on either a rigid or collapsible top and especially adapted to be employed on a collapsible top to permit its folding; and one that will conceal the top supports when in use.

A further object of the invention is to provide a device that is simple in construction, cheap to manufacture, and one that will add materially to the efficiency and appearance of the vehicle top.

Other objects of the invention are apparent from the following discription and claims.

In the drawing:

Figure 1 is a side view of a vehicle top and portions of the vehicle body, showing the curtain in protective position;

Figure 2 is a rear elevation of the same; and Figure 3 is a side elevation of the same on a larger scale, parts broken away, and showing the supporting bow sockets in dotted lines.

On the drawing, the numeral 1 designates the car body having the usual front seat 2 and rear seat 3. The top 4 is attached at its front end to the wind shield 5 in the usual manner. The top is supported at its rear end by the main support or bow 6. The top and its supports may be of rigid construction and rigidly connected together and to the vehicle, but as shown, the support or bow 6 is pivoted adjacent the forward edge of the rear seat to the vehicle as at 7 and extends upwardly and rearwardly therefrom. The supplemental support or bow 8 is pivoted to the support or bow 6 at 9 and extends upwardly and forwardly therefrom and supports an intermediate portion of the top. The pivot 9 is located at a considerable distance above the pivot 7 in order to position the supplemental support or bow where it will not interfere with the ingress and egress of the passengers and not unnecessarily obscure their vision.

Extending between the rear portion of the vehicle 10 and the horizontal portion of the bow 6 and attached thereto is the main portion 11 of a curtain 12 provided with one or more transparencies 13.

Attached to, or integral with, the main portion of this curtain, and extending forwardly therefrom is the side portion 14 of the curtain. The lower edge of this side portion is detachably connected to the side of the body by means of fasteners 16 of the usual construction. Attached to, or integral with the side portion 14 at its upper forward edge is a side wing 19. The side wing has an arcuate forward edge 17 which is designed to add to the appearance of the top and at the same time afford a clearance for passengers entering or leaving the car, as well as affording a better view of the roadside than could be had were the side wing rectangular. The side wing is so designed that when in operative position no part of the top supporting structure is visible from the outside of the car.

A transparency 18 which may be of plate glass or of any other transparent material is so positioned in the side wing of the curtain that when in operative position it will be located between the supports 6 and 8.

When it is desired to collapse the top or when the side wing 19 is not desired, it is disengaged from the top by disengaging the fastener 15 inward along a line adjacent the bow 6. Likewise, by further disengaging the fasteners 16, the whole side portion 14 may be folded inward along an approximately vertical line adjacent the rear of the back seat.

While I have shown and described my curtain device as being employed with collapsible tops it will be understood that this is only one of the forms of the embodiment of my invention as it can be employed equally as well with rigid tops or with tops or protective devices for other structures.

I claim:—

1. In a device of the class described, a vehicle body, a top having a rearwardly and upwardly extending main support therefor, a supplemental support pivotally connected to an intermediate portion of said main support and extending upwardly and forwardly therefrom, a curtain having a rear portion attached to the top and body and having a side portion attached to said body, said side portion including a forwardly and upwardly extending portion detachably connected to said top and provided with a forward arcuate edge terminating adjacent said supports and concealing the same.

2. In a device of the class described, a vehicle body, a top, supports for supporting said top from said body, a back curtain secured to the rear of said body and top, side curtains secured to said back curtain and extending forwardly therefrom, a wing portion secured to the forward portion of each of said side curtains, said wing portions being detachably connected to said top, and terminating short of said body, substantially as shown and described.

3. In a device of the class described, a vehicle body, a top, a rearwardly and upwardly extending main support for said top, a supplemental support connected to an intermediate portion of said main support and extending upwardly and forwardly therefrom, a curtain having a rear portion attached to the top and body and having a side portion detachably attached to said body, said side portion including a forwardly and upwardly extending wing portion detachably connected to said top and provided with a forward arcuate edge terminating adjacent said supports and concealing the same, said wing portion being adapted to fold inward along a line adjacent to the main support and said side portion adapted to fold inward along an approximately vertical line adjacent the rear of the back seat, substantially as described.

In testimony whereof I affix my signature.

KINGSTON FORBES.